(12) United States Patent
Moore et al.

(10) Patent No.: US 7,005,830 B2
(45) Date of Patent: Feb. 28, 2006

(54) RECHARGEABLE BATTERY PACK WITH ADAPTIVE REGENERATIVE ENERGY CONTROL AND METHOD THEREOF

(75) Inventors: Stephen W. Moore, Fishers, IN (US); Harry L. Husted, Kokomo, IN (US)

(73) Assignee: Enerdel, Inc., Fort Lauderdale, FL (US)

( * ) Notice: Subject to any disclaimer, the term of this patent is extended or adjusted under 35 U.S.C. 154(b) by 202 days.

(21) Appl. No.: 10/442,747

(22) Filed: May 21, 2003

(65) Prior Publication Data

US 2004/0012369 A1 Jan. 22, 2004

Related U.S. Application Data

(60) Provisional application No. 60/389,423, filed on Jun. 17, 2002.

(51) Int. Cl.
*H01M 10/44* (2006.01)

(52) U.S. Cl. .................................................. 320/104
(58) Field of Classification Search ................ 320/104, 320/132, 149, DIG. 21, DIG. 34; 180/65.3, 180/65.4; 290/50, 53, 54
See application file for complete search history.

(56) References Cited

U.S. PATENT DOCUMENTS

| | | | |
|---|---|---|---|
| 4,313,080 A | 1/1982 | Park | |
| 5,296,318 A | 3/1994 | Gozdz et al. | 429/192 |
| 5,578,911 A | 11/1996 | Carter et al. | 318/376 |
| 5,606,243 A | 2/1997 | Sakai et al. | |
| 5,839,816 A | 11/1998 | Varga et al. | 362/153.1 |
| 6,047,787 A * | 4/2000 | Deng et al. | 180/165 |
| 6,063,519 A | 5/2000 | Barker et al. | 429/161 |
| 6,083,912 A | 7/2000 | Khouri | |
| 6,230,496 B1 * | 5/2001 | Hofmann et al. | 60/706 |
| 6,291,097 B1 | 9/2001 | Barker et al. | |
| 6,321,145 B1 | 11/2001 | Rajashekara | 701/22 |
| 6,406,815 B1 | 6/2002 | Sandberg et al. | |
| 6,413,668 B1 | 7/2002 | Sandberg et al. | |
| 6,419,712 B1 | 7/2002 | Haverstick | |
| 6,456,042 B1 | 9/2002 | Kwok | |
| 6,518,732 B1 * | 2/2003 | Palanisamy | 320/147 |
| 6,617,078 B1 | 9/2003 | Chia et al. | |

FOREIGN PATENT DOCUMENTS

| | | |
|---|---|---|
| EP | 1265335 | 12/2002 |
| EP | 1271171 | 1/2003 |
| WO | 9820594 | 5/1998 |

* cited by examiner

*Primary Examiner*—Edward H. Tso
(74) *Attorney, Agent, or Firm*—Akerman Senterfitt

(57) ABSTRACT

A charging strategy for a rechargeable battery pack is disclosed. The battery pack is used in an application that includes a dynamoelectric machine that may operate as a motor, drawing power from the battery pack, or as a generator, delivering regenerative energy to the battery pack. The strategy monitors the nature, intensity, duration and frequency, among other things, associated with encountered episodes of regenerative energy from the dynamoelectric machine, and adjusts subsequent recharging processes to allow a calculated amount of headroom to accommodate regenerative energy inputs in the future, which may be assumed to be equal in nature, intensity, duration and frequency to what has already been observed. Overcharging is reduced or eliminated, while maximizing the amount of charge on the battery pack, and thus duration of use.

16 Claims, 2 Drawing Sheets

RECHARGEABLE BATTERY PACK WITH ADAPTIVE REGENERATIVE ENERGY CONTROL AND METHOD THEREOF

CROSS-REFERENCE TO RELATED APPLICATIONS

This application claims the benefit of U.S. Provisional Application Ser. No. 60/389,423 filed Jun. 17, 2002, the disclosure of which is hereby incorporated by reference in its entirety.

BACKGROUND OF THE INVENTION

1. Technical Field

The invention relates generally to energy-based systems, and in particular to a method and system for adaptive regenerative energy control.

2. Discussion of the Background Art

It is known in many applications, including self-propelled vehicle applications, to employ a dynamoelectric machine in a first mode as a motor in order to provide propulsion torque. In such applications, it is also known to reconfigure the dynamoelectric machine in a second mode as a generator, in order to capture and convert some of the potential or kinetic energy associated with the application into output electrical power, a process known as regeneration ("regenerative energy"). Moreover, in such applications, it is also known to provide an energy storage device, such as a battery, to power the dynamoelectric machine when operated as a motor, and to receive the regenerative energy when the dynamoelectric machine is operated as a generator. In the latter case, the regenerative energy is generally operative to increase the state of charge of the battery, until such battery is "fully" charged. Battery technologies typically used in such applications include nickel metal hydride (NiMH), lead acid (PbA) and nickel cadmium (NiCd) technologies.

One aspect of the above systems that involves tradeoffs or compromises pertains to the charging (or recharging) regimens. Specifically, while it would generally be desirable to charge the battery to its highest possible state of charge (which in turn would provide the greatest range or longest duration use for the application running off the battery), such an approach is often tempered to allow for acceptance of regenerative energy. Thus, a pair of known charging (or recharging) regimens involves (i) recharging the battery to 100% of its maximum state of charge or (ii) selecting some predetermined backoff position in advance.

It is noteworthy that the above battery technologies are somewhat tolerant of overcharging, at least up to a point, wherein input of regenerative energy above and beyond the "fully" charged level is dissipated as heat. Such a situation may occur when the battery, as fully charged, immediately receives a large level of regenerative energy. However, some known battery systems have thermal protection, which will disable the battery system when a maximum, threshold temperature is reached.

The other approach mentioned above taken in the art for battery charging regimens, which involves specifying a fixed, predetermined headroom to allow for acceptance of regenerative energy inputs (e.g., to minimize or eliminate the chance of overcharging), also has shortcomings. For example, in such approaches, a recharge level of a predetermined percent less than 100% may be specified in advance of the actual use. This fixed "headroom" allows for some level of regenerative energy to be applied to the battery system without overcharging. For applications where the power usage and regenerative energy input are relatively known in advance, this approach may provide satisfactory results. However, where the usage and regeneration patterns are expected to be (and are) unpredictable and variable, the fixed headroom approach is inflexible and inefficient. In most cases this fixed "headroom" is conservatively set (i.e., with the worst case in mind—so as to accept the largest possible regenerative energy inputs). This approach thus represents an inherent compromise, inasmuch as the total range or duration of use running off the battery would be decreased relative to a battery charged to 100% of its maximum state of charge.

Another battery technology in addition to the above mentioned types is known, and involves lithium chemistries, as seen by reference to U.S. Pat. No. 6,063,519 to Barker et al. One characteristic, however, of lithium chemistry batteries is that it has less tolerance to overcharging than the other battery technologies referred to above. That is, in many instances, the additional voltage, and in part, heat due to overcharging may seriously impair or damage the battery. Accordingly, the known charging regimen where the battery is charged to 100% is realistically unavailable in the circumstances described above, since the possibility of receiving regenerative energy when the battery is fully charged could have catastrophic results.

There is therefore a need for a charging regimen that minimizes or eliminates one or more of the above-identified problems.

SUMMARY OF THE INVENTION

An object of the present invention is to solve one or more of the problems as set forth above. One advantage of the present invention is that it allows dynamic adaptation of a charging strategy for a rechargeable battery based on its actual use, thereby maximizing the duration of use of an application that is using the battery (i.e., increases performance) while minimizing the occurrence of overcharging. The present invention thus allows, in one embodiment, greater applicability of battery technologies, such as lithium chemistry technologies, that have a greater intolerance to overcharging. Alternatively, in such embodiment, overcharge intolerant battery technologies can be used while eliminating extra circuitry and/or structure previously necessary to dissipate heat due to overcharging.

These and other features, objects, and advantages are realized by the present invention, which includes a method of operating a battery pack rechargeable using regenerative energy. The method includes the steps of determining an operating characteristic of an application employing the battery pack, which, in one embodiment, involves determining a regenerative energy parameter based on observed regenerative energy provided to the battery pack during operation. The method further includes adjusting a charging strategy based on the observed operating characteristic, which in regenerative embodiment referred to above includes the step of charging the battery pack in accordance with the determined regenerative energy parameter.

A system according to the invention is also presented.

BRIEF DESCRIPTION OF THE DRAWINGS

The present invention will now be described by way of example, with reference to the accompanying drawings.

DETAILED DESCRIPTION OF THE PREFERRED EMBODIMENTS

Figure 1:
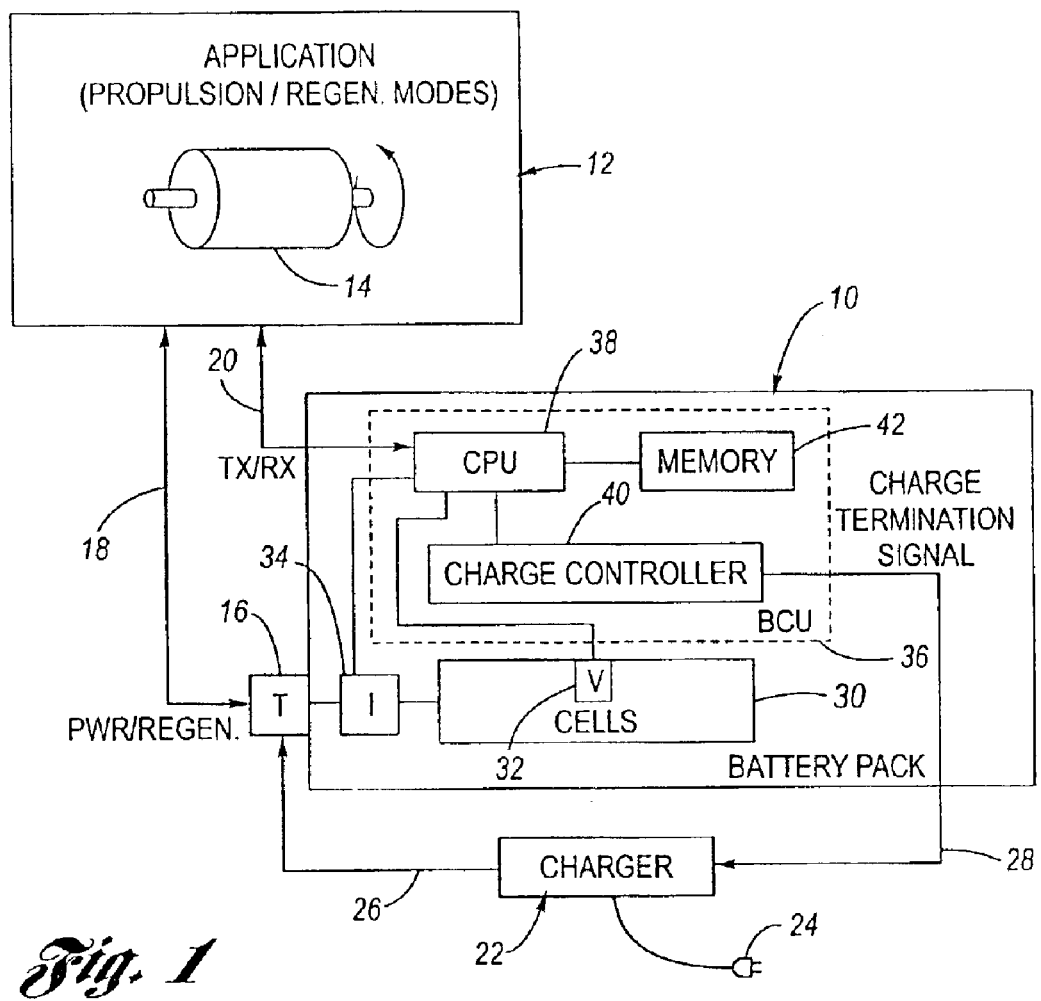
FIG. 1 is a simplified schematic and block diagram view of an battery pack according to the present invention, in an exemplary embodiment.

Referring now to the drawings wherein like reference numerals are used to identify identical components in the various views, FIG. 1 is a simplified, schematic and block diagram view of an inventive battery pack 10 according to the invention suitable for use in connection with any one or more of a plurality of exemplary applications 12. Application 12, in the illustrated embodiment, is of the type employing a dynamoelectric machine 14, which may alternatively be configured for operation (i) in a first mode wherein the machine 14 is used for propulsion torque, or (ii) in a second mode different from the first mode wherein the machine 14 is configured for the production of regenerative energy (i.e., it is configured as a generator). For example, such applications may include, but are not limited to, self-propelled vehicle applications, although other application stationary in nature (i.e., rotating systems having loads with inertia) are also included within the spirit and scope of the invention. Dynamoelectric machine 14 may comprise conventional apparatus known to those in the art, for example only, AC or DC electric motors, brush-based or brushless electric motors, electromagnet or permanent magnetic based electric motors, reluctance-based electric motors, or the like. It should be clearly understood that the foregoing is exemplary only and not limiting in nature.

Battery pack 10 includes means for observing and analyzing predetermined operating characteristics related to the usage cycle of the battery pack itself (or operating cycle of the application 12), and, further, for using such observations and analysis to adjust a charging (or recharging) strategy for battery pack 10. The present invention is adapted to establish an adaptive control over the recharging process so as to optimize subsequent usage of the battery pack 10, which involves both (i) power drawn from the battery (i.e., the strategy maximizes the duration of use running off the battery) as well as (ii) regenerative energy being applied to the battery pack 10 (i.e., the strategy minimizes or eliminates overcharging situations). The following description relates to a preferred regenerative energy embodiment; however the invention is not so limited, and is applicable to other observed usage characteristics.

With continued reference to FIG. 1, battery pack 10 may include an input/output terminal 16, designated "T" (for Terminal) in the drawings. A power bus 18, designated "PWR/REGEN." in the drawings, is configured to allow electrical power to be drawn for battery pack 10 when dynamoelectric machine 14 is operated in a first, propulsion torque mode. Power bus 18 alternatively may be configured or used to carry electric energy, hereinafter referred to as regenerative energy, produced by dynamoelectric machine 14 when operated in the second, regenerative energy production mode (as a generator). As further shown, in the illustrated embodiment, battery pack 10 may also include a communications port configured for connection to a communications line 20, designated "TX/RX" (transmit/receive) in FIG. 1. Communications line 20 may be configured for bi-directional communications, for example control signals or control messages, between battery pack 10 and application 12, examples of which shall be described below.

FIG. 1 also shows an electrical battery charger 22, including in exemplary fashion a conventional electrical plug for connection to a wall outlet (not shown) or the like. Charger 22 is configured for charging (or recharging) battery pack 10. Charger 22 includes a charging power line 26 configured for connection to battery pack 10 for charging (or recharging) the battery cells thereof, although for simplicity sake, line 26 is shown connected to the I/O terminal 16 (T). In addition, charger 22 may have an input configured to receive a control signal, such as a charge termination signal, on a control line 28 from battery pack 10. The charge termination signal on line 28 is configured to cause charger 22 to discontinue charging battery pack 10 (i.e., to stop charging), for example, when the battery pack 10 has been charged to a calculated level according to the invention, as described in greater detail below. Alternatively, charger 22 may be variable charger 22 wherein the control signal on line 28 is operative to adjust the charging current as well as to terminate the charge current. Charger 22 may comprise conventional charging componentry known to those of ordinary skill in the art.

In the illustrated embodiment, battery pack 10 includes one or more battery cells 30, at least one voltage sensor 32, at least one current sensor 34 and a battery control unit (BCU) 36. BCU 36 may include a central processing unit (CPU) 38, a charge controller 40, and a memory 42.

Cells 30 are configured to produce electrical power, and may be arranged so that the collective output thereof is provided on I/O terminal 16, as in the illustrated embodiment. Conventional electrical current flows out of terminal 16 to the load (i.e., the dynamoelectric machine 14) in application 12. Cells 30 are also configured to be rechargeable, for example, by receiving conventional electrical current into battery pack 10 at I/O terminal 16. The recharging current may be from either charger 22 or from machine 14 operating as a generator. Cells 30 may comprise conventional apparatus according to known battery technologies, such as those described in the Background, for example, NiMH, PbA, or NiCd, or the like. In a preferred embodiment, however, cells 30 comprise cells formed in accordance with various Lithium chemistries known to those of ordinary skill in the energy storage art. In the illustrated embodiment, cells 30 are arranged to produce a direct current (DC) output at a predetermined, nominal level (e.g., 80 volts at 100% of full state of charge).

Voltage sensor 32 is configured to detect a voltage level and produce a voltage indicative signal representative of the detected voltage. In one embodiment, one voltage sensor 32 is provided to detect the overall voltage output of the combination of cells 30. In a preferred embodiment, however, a plurality of voltage sensors 32 (the plurality not being shown for clarity) are employed, at least one for each individual cell included in battery pack 10. Through the foregoing multiple sensor approach, advanced diagnostics and charging strategies may be implemented, as understood by those of ordinary skill in the art. Voltage sensor(s) 32 may comprise conventional apparatus known in the art.

Current sensor 34 is configured to detect a current level and polarity of the electrical (conventional) current flowing out of (or into) battery pack 10 via terminal 16, and generate in response a current indicative signal representative of both level and polarity. Current sensor 34 may comprise conventional apparatus known in the art. In the preferred embodiment, the current sensor 34 is used to monitor operating characteristics, particularly, to determine whether the application 12 is operating in a regen mode, by evaluating whether current is flowing into the battery pack, among other things.

Battery Control Unit (BCU) 36 is configured for controlling the overall operation of battery pack 10, including the adjustments to the charging strategy according to the invention. BCU 36 may include a central processing unit (CPU) 38, a charge controller 40, and a memory 42.

CPU 36 may comprise conventional processing apparatus known in the art, capable of executing preprogrammed instructions stored in memory 42, all in accordance with the functionality as described in greater detail below. In this regard, memory 42 is coupled to CPU 36, and may comprise conventional memory devices, for example, a suitable combination of volatile, and non-volatile memory so that main line software can be stored and further allow processing of dynamically produced data and/or signals.

Charge controller 40 is also coupled to CPU 38, and is configured so as to allow CPU 38 to preset a charge termination voltage, such that when the actual voltage level from sensor(s) 32 reach the charge termination voltage, controller 40 generates the above-mentioned charge termination signal on line 28. This control signal is operative to shut down external charger 22, as described above. Charge controller 40 may be configured as a separate unit or circuit, as illustrated, or may be implemented in software executed on CPU 38.

As described in the Background, lithium chemistry batteries are relatively intolerant of overcharging. Thus, a freshly (fully) charged battery cannot withstand significant amounts of regenerative energy until some of its charge is actually used up (e.g., in the propulsion or drive mode of the dynamoelectric machine). The method and apparatus in accordance with the present invention observes and "learns" the usage characteristics of application 12, and in response thereto adapts or modifies a charging strategy to "best" match such usage cycle. In one embodiment, where the observed characteristic of the application is the amount of regenerative energy being produced, the invention adapts as follows: First, for applications 12 that produce regenerative energy often (and which are of an intensity that exceeds certain parameters, described below), the invention is operative to adapt a charging strategy so as to provide a dynamically-calculated headroom adapted to accommodate the regenerative energy expected during subsequent uses of the application. Secondly, however, for applications 12 that do not produce significant regenerative energy very often, the invention is operative to adapt the charging strategy to provide just a minimal amount of dynamically-calculated headroom (thus extending the duration of use of the battery by the application, with due regard to eliminating overcharging). Singular applications that experience multiple use cycles (such as a self-propelled vehicle sharing several drivers) will accumulate such "learning" and adapt the charging strategy accordingly.

In the illustrated embodiment of FIG. 1, the usage or operating characteristic observed and "learned" relates to regenerative energy produced by application 12 and sent back to battery pack 10 for charging. In broad terms, CPU 38, configured through software, defines the means for determining a regenerative energy parameter based on regenerative energy provided to battery pack 10 during operation of the application 12. The regenerative energy parameter is a parameter indicative of the nature, intensity, duration and frequency of regenerative energy inputs sent to battery pack 10. Charge controller 40, which may also be configured through software, defines the means for controlling the subsequent charging of the battery pack (i.e., cells 30) based on or in accordance with the determined regenerative energy parameter(s). In the embodiment illustrated in FIG. 1, the regenerative energy parameter is used by CPU 38 to calculate a charge termination voltage (described above), which is provided to charge controller 40.

Figure 2:
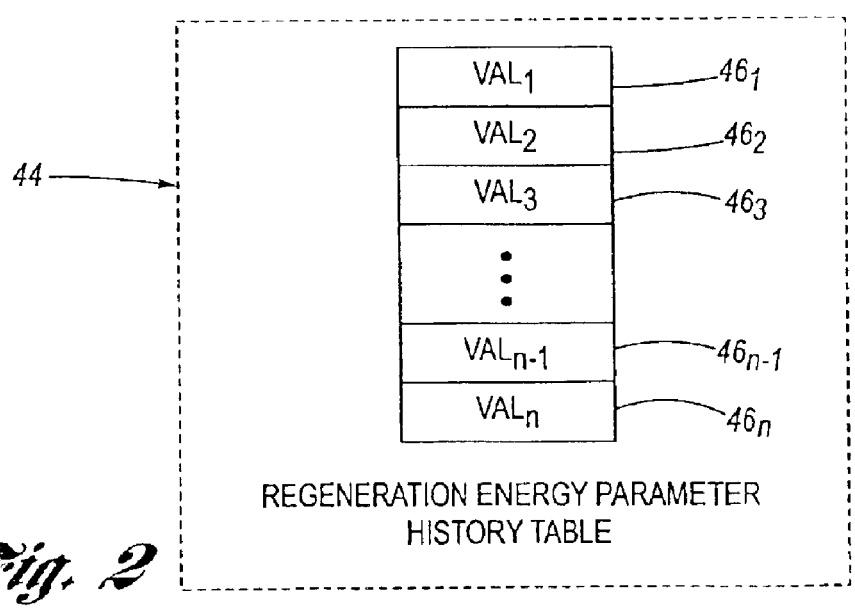
FIG. 2 is a diagrammatic view showing, in greater detail, a history table portion of the memory shown in FIG. 1.

FIG. 2 shows a data structure, namely, a regenerative energy parameter history table 44, which is configured to store a plurality of regenerative energy parameter values respectively designated $VAL_1$ $46_1$, $VAL_2$ $46_2$, $VAL_3$ $46_3$, . . . , $VAL_{n-1}$ $46_{n-1}$, $VAL_n$ $46_n$. The history table 44 is a mechanism through which operating characteristics are tracked and "learned" by the method and apparatus of the present invention. In one embodiment, history table 44 comprises a First In, First Out (FIFO) buffer having a finite length (e.g., 6 entries, 8 entries, 10 entries, etc.). The length of the buffer may be selected to reflect the responsiveness of the method and apparatus to changes. Each entry corresponds to the respective regenerative energy input profile, as observed (as accumulated, see below), from the time of the last charging of the battery pack by charger 22. It should be understood, however, that other approaches are possible and yet remain within the spirit and scope of the present invention.

Figure 3:
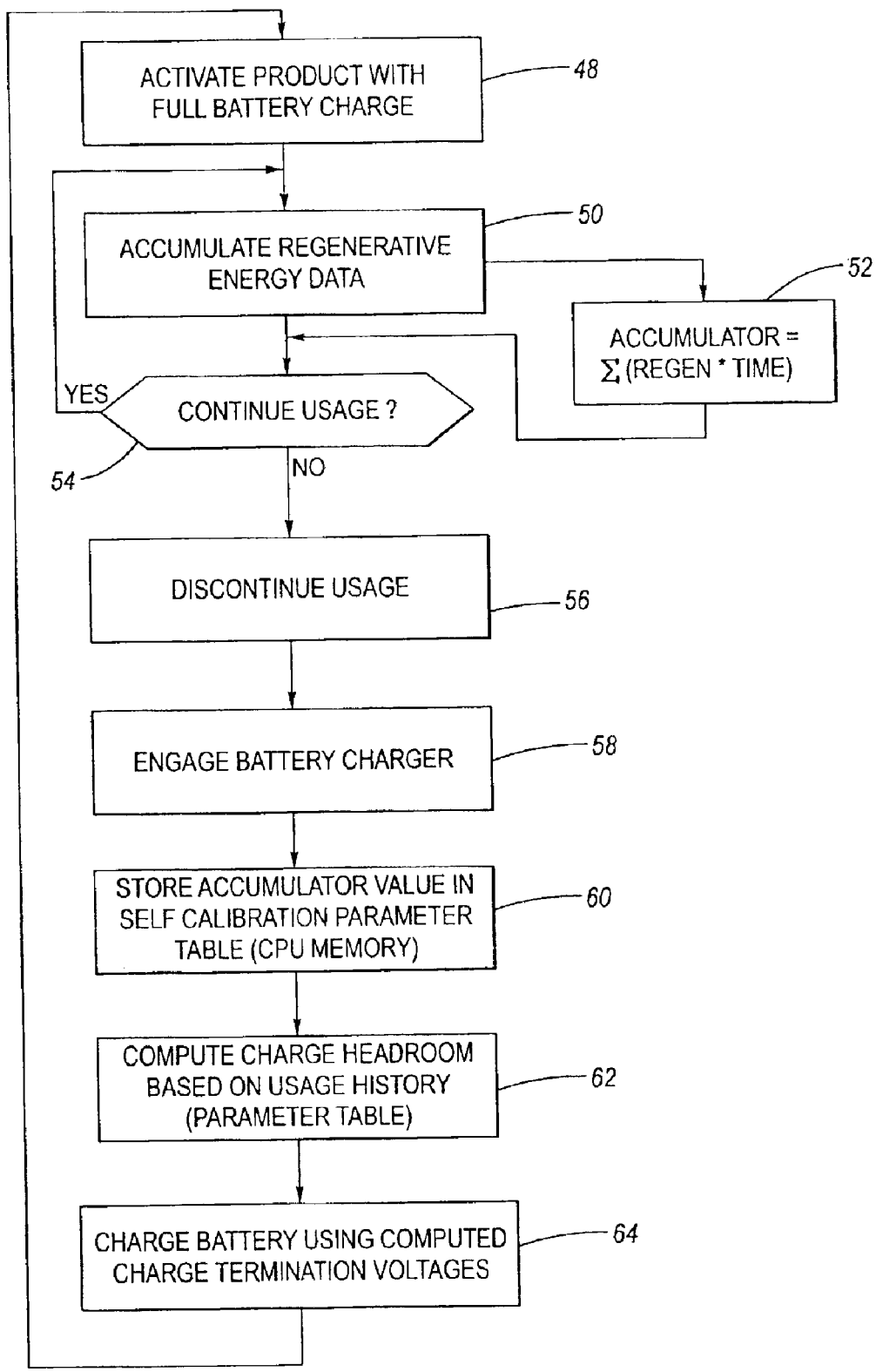
FIG. 3 is a flowchart diagram illustrating a method in accordance with the present invention.

Referring now to FIGS. 1–3, a method in accordance with the present invention will now be set forth. It should be understood that the following functionality, unless specifically described with respect to a particular structure of the illustrated embodiment of FIG. 1, or which has already been specifically described in connection with a specific structure of FIG. 1, may be implemented in software suitable for execution by CPU 38.

Referring specifically to FIG. 3, in step 48, the application 12 ("product" in the flowchart) is activated with a "full" battery charge. In the context of the present invention, and the flowchart in FIG. 3, "full" may take on different meanings to reflect ever-changing charging strategies. For example, the charging default from the "factory" may be initially preset to 100% of the maximum state of charge, or it may be set to some level less that 100%, depending on the expected use (or the level of regenerative energy expected to be encountered). As the method iterates through charging cycles (i.e., as it "learns"), and the charging strategy is adapted to differing conditions, the specific level constituting a "full" charge may vary. If large amounts of regenerative energy are encountered, the invention will increase the amount of headroom or excess capacity in order to accommodate it. Likewise, if the level of regenerative energy is observed to be small, correspondingly small levels of overhead are built in to the charging strategy, thereby improving performance. The method then proceeds to step 50.

In step 50, the method is operative to accumulate regenerative energy data, based on monitored inputs from, for example, current sensor 34. That is, conventional electrical currents entering battery pack 10 may be considered regenerative energy episodes. As shown in step 52, the observation process is performed as a function of both the regenerative energy itself (i.e., intensity) as well as time (i.e., duration, frequency, etc.). While the method may include a straightforward accumulation function, the invention is not so limited. In a preferred embodiment, the method includes a discriminator feature that discriminates or distinguishes regenerative energy episodes based on their tendency to accomplish charging. For example, low intensity, repeating regenerative energy episodes interleaved with corresponding intervals of power usage (power draw) may have a relatively insignificant effect on increasing the overall state of charge in the battery cells 30. This may warrant only small allocations of headroom in the charging strategy. On the other hand, relatively high intensity, long duration episodes of regenerative energy may have a fairly significant effect in increasing the state of charge of battery cells 30 (and thus has a much greater chance of overcharging).

Greater levels of headroom are thus warranted. While these two situations may, if simply accumulated, have the same "area under the curve", their respective impacts are not. Accordingly, the preferred embodiment implements some form of a discrimination feature. Other approaches are possible, and still remain within the spirit and scope of the present invention. Overall, the processing that occurs in steps 50 and 52 together define the step of determining a regenerative energy parameter 46, based on the regenerative energy provided to battery pack 10 during operation of application 12. The method then proceeds to step 54.

In step 54, usage of application 12 is continued. This means that the application 12 has not undergone any recharging by external charger 22. For example, the application 12, for a self-propelled vehicle, may be turned on and off multiple times, and used by different operators, but has not been plugged in for recharging. The method then proceeds to step 56.

In step 56, "usage" of the application 12 is discontinued. This means that the operator has made the last actual use of the application 12 prior to charging using charger 22.

In step 58, charger 22 is engaged (i.e., it is powered up, and connected to the battery pack 10, as illustrated in FIG. 1). The method may then proceed to step 60, in one embodiment.

In step 60, the CPU 38 stores the accumulated value (i.e., the regenerative energy parameter designated $VAL_1$ $46_1$.) in the history table 44 (best shown in FIG. 2). However, it should be understood that step 60 may not be performed each time the charger is engaged. There may be some parameters, for example the amount of time between charges, which when such parameter met a predetermined limit, would warrant updating the memory, although in some other circumstances where the limit was not met that the memory would not be updated. The method then proceeds to step 62.

In step 62, the CPU is configured to determine a dynamic charge headroom, which is taken relative to a maximum state of charge of the battery, using the regenerative energy parameter(s) stored in the history table 44. It should be appreciated that on the first loop through, the usage history table 44 only contains one regenerative energy parameter. However, through subsequent charging cycles (using the charger 22), the history table will become fully populated (i.e., it "learns"). In an alternate embodiment, the usage table 44 may be populated with predetermined "factory-set" parameter values. Thereafter, in the illustrated embodiment, the earliest parameters in the table 44 will be pushed out and discarded. This particular implementation has the effect of "time" filtering out "old" regenerative energy usage parameters ("time" and "old" being taken with reference to a recharging cycle as a unit of measure).

A variety of approaches may be used to process the plurality of regenerative energy parameters $46i$. For example, a simple selection of the single most significant parameter may be used to implement a charging strategy for a "worst case" regenerative energy inputs (i.e., one in which the greatest amount of headroom is provided so as to accommodate the largest amount of regenerative energy expected to be encountered, which may be assumed to be equal to the most significant regenerative energy input observed in the history of the operation of the application 12). As described above, the invention maximizes range/duration of the application by allowing the maximum amount of recharging to occur by external charger 22, with due regard given to the possibility of large regenerative energy inputs being applied to such a "fully" charged battery pack 10 so as to avoid overcharging. The method then proceeds to step 64.

In step 64, the CPU 38 is configured to calculate a charge termination voltage. This is the physical voltage threshold that corresponds to the determined dynamic headroom calculated in step 62. Step 64 may be implemented using an equation, or, alternatively, a look-up table (LUT). For example, in one embodiment, battery pack 10, particularly cells 30 (lithium chemistry cells), output 80 volts when 100% fully charged, and output 66 volts when close to 0% charged. The progression between 0% and 100% is nearly linear between 66 volts and 80 volts. A simple straight line equation can be predetermined to calculate the cutoff or charging termination voltage level. Thus, a charge termination voltage of 79 volts in this example leaves a headroom of about 7% (i.e., about 93% charged); a charge termination voltage of 67 volts in this example leave a headroom of about 93% (i.e., only about 7% charged), and so on. Of course, other battery chemistries or technologies may have different characteristics, requiring a different calculation process.

In addition, there are some circumstances where notwithstanding the capacity or headroom for additional charging as described above, a condition, namely impedance, of the battery pack resists such charging. For example, a cold battery pack (e.g., a temperature parameter) may result in an increased impedance. As another example, an "old", either chronological or the number of times it has gone through recharge, may also exhibit an increased impedance. The increased impedance is with respect to a new battery pack at a normal ambient, room temperature. In these and other circumstances where the impedance is increased, an increased level of headroom may be provided. Therefore, in another aspect of the present invention, a battery impedance parameter is provided. The step of calculating a charge termination voltage therefore may be performed by the substeps of (i) calculating a battery impedance, and (ii) determining an adjusted charge termination voltage using the calculated battery impedance. The battery impedance may be determined through look up of a preprogrammed value, for and at different temperature and/or age progressions, or through the use of a so-called battery state estimator. There are a number of battery state estimator approaches known in the art, and which would be suitable for use in the present invention as described above.

Moreover, it should be appreciated that while the charge termination voltage has been described with respect to an overall output voltage of the battery pack, in an alternate embodiment, it is taken with respect to an individual cell(s) of the battery pack. In particular, battery pack 10 includes a plurality of cells 30. The charging of each cell, for example in a lithium chemistry battery pack, is controlled. It should therefore be understood that one cell in the battery pack may be at a higher voltage than the others wherein the whole charging process is terminated when the limit has been reached for that particular cell. Thus, the charge termination voltage should be understood to apply to either the overall output voltage of the battery pack, or, the one or more particular cells within the battery pack, or some combination of the foregoing, all as the circumstances of the particular battery pack and cells (i.e., battery technology, charging capability, etc.) being used may require.

The charge termination voltage is provided to charge controller 40, as described above. The remainder of step 64 involves charging battery pack 10 using the calculated charge termination voltage (which corresponds to the dynamic headroom, which in turn was determined using the value(s) in the usage history table). The method then loops to step 48, wherein the whole methodology is repeated.

It should also be appreciated that charging of battery pack 10 occurs through two different mechanisms in the illustrated embodiment: (i) via regenerative energy and (ii) via the external charger 22. From the foregoing, it may be observed that if the battery pack 10 is "fully" charged, for example at 100%, and initially encounters a significant regenerative energy episode, that there may not be enough (or any) observed history to have implemented any adjustments to the subsequent charging strategies. In such case, the CPU 38 may detect such an attempt at overcharge via voltage and current sensors 32 and 34, and in response issue a stop regeneration command to application 12 using communications line 20. Application 12, of course, would have to be configured to understand this control message and take appropriate response action to abate the regeneration, in order to avoid damage to battery cells 30. However, such regenerative energy would nonetheless be monitored, and recorded. Then, the next time the battery pack 10 is recharged using charger 20, some uncharged capacity or headroom would be allocated, based on the history as described above, calculated to accommodate another encounter with such significant regenerative energy episode.

What is claimed is:

1. A method of operating a rechargeable battery pack using regenerative energy comprising the steps of:

determining a regenerative energy parameter based on regenerative energy provided to the battery pack during operation over a plurality of charging cycles, said plurality of charging cycles interleaved with a plurality of discharging cycles; and charging the battery pack based on the regenerative energy parameter during at least one of said plurality of charging cycles.

2. The method of claim 1 wherein said determining step includes the substep of: determining an intensity and time at said regenerative energy parameter.

3. The method of claim 1 wherein said regenerative energy parameter comprises electrical current.

4. The method of claim 1 the method further comprising the step of:

storing said regenerative energy parameter over individual ones of said plurality of charging cycles as separate regenerative energy cycle entries in a history table.

5. The method of claim 4 wherein said charging step includes discriminating said regenerative energy cycle entries based on respective magnitude and time and their respective tendency to accomplish charging.

6. The method of claim 1 further including the steps of:

providing an application for the battery pack that includes a dynamoelectric machine alternatively configured for propulsion and production of regenerative energy; and monitoring an input/output terminal of the battery pack for the presence of regenerative energy.

7. A rechargeable battery pack comprising:

at least one battery cell configured to produce electrical power on a terminal thereof;

means for determining a regenerative energy parameter based on regenerative energy provided during regenerative energy intervals to said terminal of said battery pack during operation over a plurality of charging cycles, said plurality of charging cycles interleaved with a plurality of discharging cycles; and means for controlling charging of said battery pack in accordance with said regenerative energy parameter based on at least one of said plurality of charging cycles.

8. The battery pack of claim 7 wherein said determining means includes a central processing unit (CPU) configured to determine a charge headroom relative to a maximum state of charge of said battery cell using said regenerative energy parameter, said CPU being further configured to calculate a charge termination voltage that corresponds to said charge headroom.

9. The battery pack of claim 8 wherein said controlling means includes said CPU configured as a charge controller that generates a charge termination signal when a voltage level on said terminal reaches said charge termination voltage.

10. The battery pack of claim 9 further including means for producing a stop regeneration signal when said voltage level on said terminal reaches said charge termination voltage.

11. The battery pack of claim 10 wherein said stop regeneration signal is provided to an application having a dynamoelectric machine alternatively configured for propulsion and for production of regenerative energy, said application being configured to discontinue said configuration for the production of regenerative energy in response to said stop regeneration signal.

12. A method of operating a rechargeable battery pack using regenerative energy, comprising the steps of:

determining a regenerative energy parameter based on regenerative energy provided to the battery pack during operation, and charging the battery pack using the regenerative energy parameter, wherein said charging step includes the substeps of:

determining a charge headroom relative to a maximum state of charge of the battery pack;

using the determined regenerative energy parameter, calculating a charge termination voltage that corresponds to said charge headroom; and charging the battery pack until the charge termination voltage is obtained.

13. The method of claim 12 wherein the regenerative energy parameter is based on intensity and time of regenerative energy provided during regenerative energy intervals to the battery pack during operation over a plurality of charging cycles, said charging cycles having power usage intervals interleaved with said regenerative energy intervals.

14. The method of claim 13, further comprising the step of: storing a plurality of said regenerative energy parameters accumulated over said charging cycles in a history table.

15. The method of claim 14 wherein said step of calculating said charge termination voltage includes the substep of: processing said plurality of regenerative energy parameters.

16. The method of claim 15 wherein said processing step includes the substep of: selecting at least one of said plurality of regenerative energy parameters from said history table.

* * * * *